J. F. & S. C. THOMAS.
Seed-Drills and Fertilizers.

No. 149,545. Patented April 7, 1874.

Witnesses:
G. Mattily
Solon A. Kemon

Inventor:
Jno. F. Thomas
Saml. C. Thomas
Per
Attorneys.

UNITED STATES PATENT OFFICE.

JOHN F. THOMAS AND SAMUEL C. THOMAS, OF ADAMSTOWN, MARYLAND.

IMPROVEMENT IN SEED-DRILLS AND FERTILIZERS.

Specification forming part of Letters Patent No. 149,545, dated April 7, 1874; application filed January 9, 1874.

*To all whom it may concern:*

Be it known that we, JOHN F. THOMAS and SAMUEL C. THOMAS, of Adamstown, in the county of Frederick and State of Maryland, have invented a new and Improved Combined Seed-Drill and Fertilizer; and we do hereby declare that the following is a full, clear, and exact description of the same, reference being had to the accompanying drawing forming a part of this specification, in which—

Figure 1:
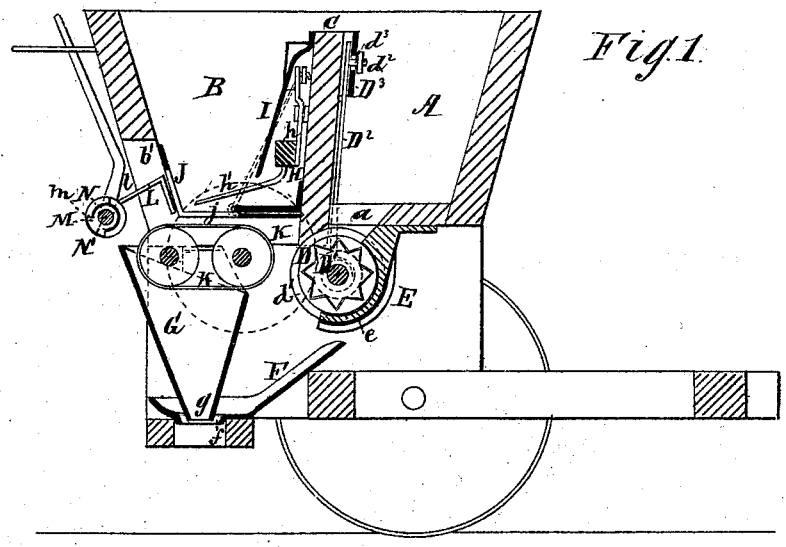
Figure 2:
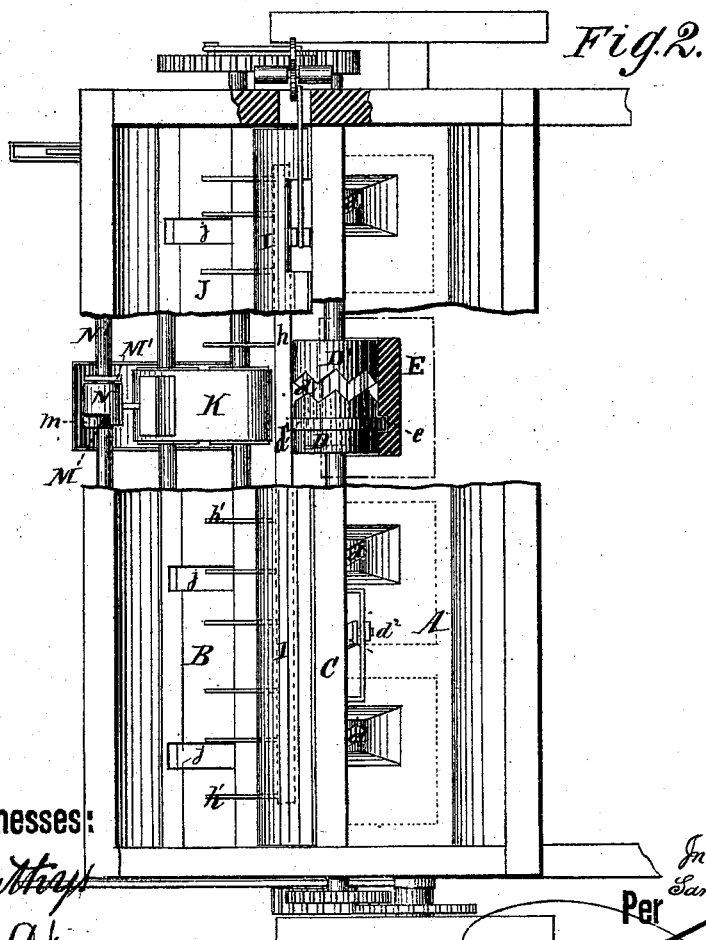

Figure 1 is a vertical section. Fig. 2 is a top view, partly broken out.

The invention consists in bringing the discharge-spouts of seed and manure near the ground, and one around the other, so that the seed and manure will be left in the ground in close proximity, but not in contact, thus avoiding the destruction of the vitality of any of the seeds; in protecting the reciprocating stirrer of hopper by an apron; in combining with each endless carrier an angle-gate to regulate the feed; and in combining, with a seed-gate, a spring-held spool, which will allow the gate to yield to a stone or other hard substance.

A represents the seed, and B the manure, hopper, the two separated by the longitudinal partition C. $a$ is a series of cavities in the bottom of hopper A, placed at regular intervals and next to the partition C. Immediately under these cavities is the rotary two-part seed-conveyer D D$^1$, having the zigzag channel $d$ there around. This conveyer is provided with a guide-rib, $d^1$, that fits in a corresponding groove, $e$, of the curved plate E, and, rotating in close proximity to said plate, allows the seed to be carried in the groove $d$, and emptied upon the inclined trough F. The latter has, at the lower end of incline, a bottom-open bowl or funnel, $f$, into the middle of which projects the discharge-spout $g$ of the manure-vessel G. The two parts of the seed-transferrer D D$^1$ are keyed together, so as always to rotate in the same direction and by the same movement, but are divided on the line of the zigzag groove $d$, the former sliding within the latter longitudinally, so as to increase or diminish the width of said groove, thus regulating the quantity of seed distributed with great nicety and precision. The lever D$^2$, that passes up through hopper A, is provided with clamp-screw $d^2$, and is held in the slot $d^3$ of plate D$^3$, so as to enable this adjustment to be conveniently made from the top of hopper. The manure-hopper B is provided with a reciprocating stirrer, H, whose head $h$ moves back and forward against the partition C, and is protected from being seed-clogged by the apron I, while its teeth $h'$ are bent out so as to project over the bottom slots or apertures $j$, and keep them always unstopped. These apertures $j$ are formed in an angle-plate, J, extending over more or less of the bottom, and also over a portion of the correspondingly-apertured side $b'$. Under these pass the endless belts K, that carry out the manure and discharge it into vessel G. L is a series of angle plates or gates, that are movable so as to cover a greater or less part of the slots $j$, thus regulating the quantity of manure distributed to the acre or given measure of land. These gates L have shanks $l$ rigidly attached to spools N, that are held by springs on shaft N$'$, between rings M M$'$, the former of which has a stop, $m$, to limit the backward throw of the gates.

By this means the gate will be caused to rise under the pressure of a stone or other hard obstacle, to let it pass out and to fall back again into its original position.

The gear-wheels, and other operative mechanism for driving the various parts described, are such as have been employed in an analogous manner heretofore, and therefore need no specific description.

The general operation is as follows: The seed and manure pass from their respective hoppers to conveyer rolls and belts, the manure being dropped from chamber G through its spout $g$, while the seed is transferred down the inclined trough into its funnel $f$. The manure is thus dropped in the center and the seed distributed in a circle around it.

Having thus described our invention, what we claim as new, and desire to secure by Letters Patent, is—

1. The combination, with reciprocating stirrer H, having head $h$, movable against the partition C, and having teeth $h'$, bent out over the holes $b$ of the apron I, arranged as and for the purpose described.

2. The combination of angle-gate L, endless manure-carrier K, and hopper B, having the plate J, with angle-slot $j$, as and for the purpose specified.

3. The combination, with a seed-gate having the shank $l$, of a spool, N, spring-held between rings M M' to the shaft N', to allow the gate to yield to a stone or other hard substance, in the manner described.

JOHN FRANKLIN THOMAS.
SAMUEL C. THOMAS.

Witnesses:
SOLON C. KEMON,
CHAS. A. PETTIT.